(12) United States Patent
Osawa et al.

(10) Patent No.: US 6,736,368 B2
(45) Date of Patent: May 18, 2004

(54) GATE VALVE

(75) Inventors: Yoshio Osawa, Saitama (JP); Koichi Mori, Saitama (JP)

(73) Assignee: Eagle Industry Co., Ltd., Tokyo (JP)

( * ) Notice: Subject to any disclaimer, the term of this patent is extended or adjusted under 35 U.S.C. 154(b) by 136 days.

(21) Appl. No.: 10/199,477

(22) Filed: Jul. 22, 2002

(65) Prior Publication Data

US 2004/0011985 A1 Jan. 22, 2004

(51) Int. Cl.[7] .................................................. F16K 3/16
(52) U.S. Cl. ........................................ 251/203; 251/158
(58) Field of Search .......................... 251/158, 193–204, 251/251–263

(56) References Cited

U.S. PATENT DOCUMENTS

| | | | | |
|---|---|---|---|---|
| 4,817,915 A | * | 4/1989 | Tinner | 251/199 |
| 5,415,376 A | * | 5/1995 | Ito | 251/158 |
| 6,082,706 A | * | 7/2000 | Irie | 251/158 |
| 6,295,968 B2 | * | 10/2001 | Torii et al. | 123/399 |
| 6,565,066 B2 | * | 5/2003 | Osawa et al. | 251/203 |

* cited by examiner

Primary Examiner—Paul J. Hirsch
(74) Attorney, Agent, or Firm—Arent Fox PLLC

(57) ABSTRACT

A gate valve having a valve body, a valve rod, a regulation device, a cam mechanism and a drive for supplying a straight-move force to the cam mechanism is provided. The valve rod is held so that it can move in a straight-move direction of opening and closing the valve via a pair of linear guides provided on both sides of the valve rod.

13 Claims, 8 Drawing Sheets

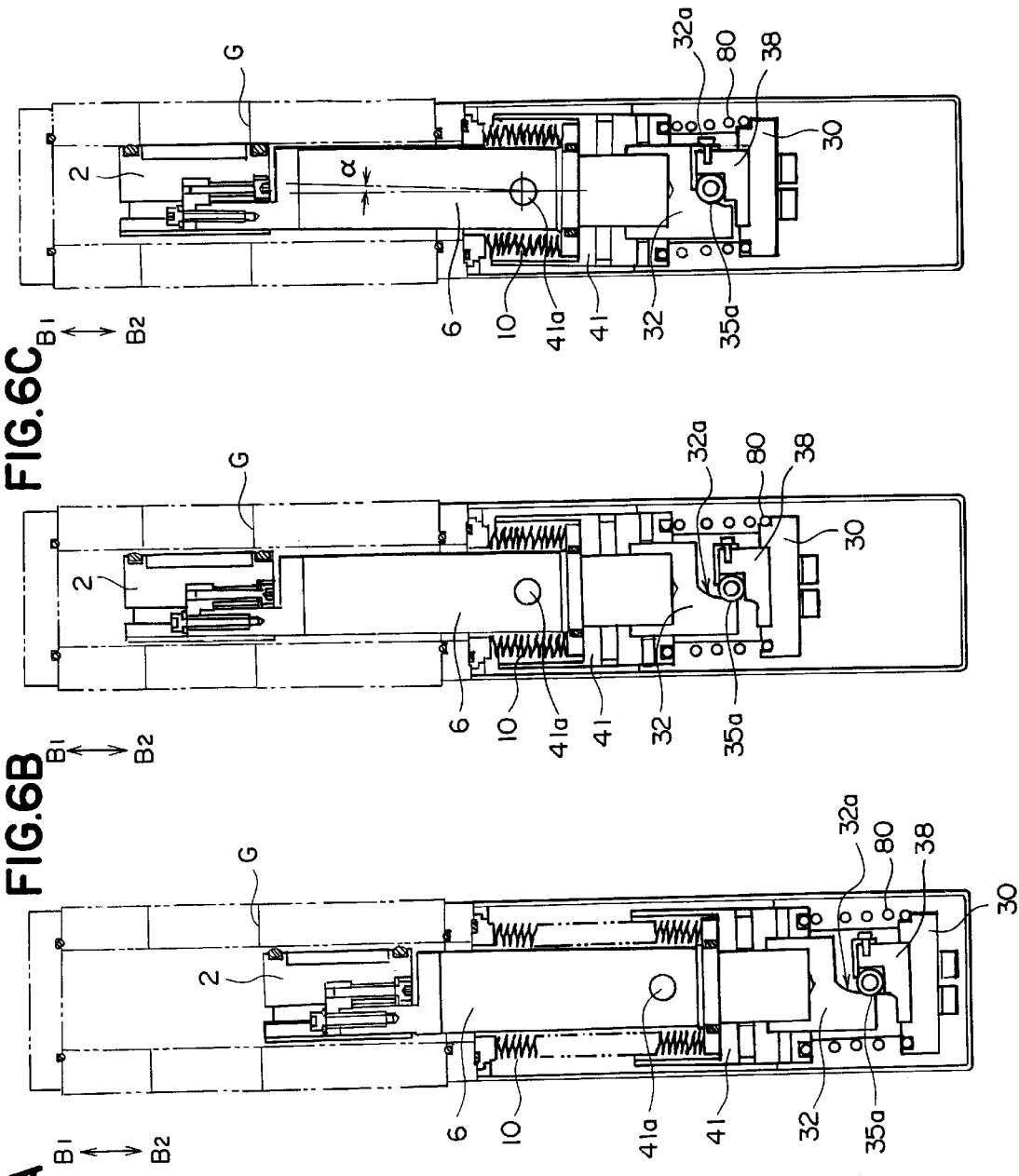

GATE VALVE

BACKGROUND OF THE INVENTION

1. Field of the Invention

The present invention relates to a gate valve for opening and closing a variety of openings, for example, relates to a gate valve capable of airtightly opening and closing an opening of a vacuum process chamber used for a production process of a semiconductor apparatus.

2. Description of the Related Art

In a dry etching step, a sputtering step or an epitaxial wafer forming step, etc. in the manufacturing process of a semiconductor device, a multi-chamber structure vacuum process apparatus comprising a plurality of vacuum process chambers connected with each other is used.

In a vacuum process apparatus of this kind, a wafer is transported to and from a transport chamber to a vacuum process chamber via a gate, and a gate valve is provided for securing a vacuum and cleanness of the vacuum process chamber. As a conventional gate valve, one disclosed in the U.S. Pat. No. 5,415,376 is known.

However, the conventional gate valve has disadvantages below.

First of all, the gate valve described in the above U.S. Pat. No. 5,415,376 is configured to guide a vertical move of a valve rod by a guide mechanism comprised of a pivotal shaft and a groove guide, so a certain clearance would be necessarily designed between the pivotal shaft and the groove guide. Due to this essential clearance, it is liable that the valve rod rattles and which becomes a cause of fluctuation and noise or ends up in causing rocking. This disadvantage becomes noticeable particularly when the gate valve is driven at a high speed.

Also, the one disclosed in the above U.S. Pat. No. 5,415,376 is a gate valve of a vertical drive type wherein the valve rod moves in the vertical direction, while in a gate valve of a horizontal drive type wherein the valve rod moves back and forth in the horizontal direction, since the gravitation of the valve body attached at one end of the valve rod acts as a moment on the horizontal drive of the valve rod, probability of an occurrence of fluctuation, noise and rocking due to the above rattling becomes higher.

The second disadvantage of the gate valve in the above U.S. Pat. No. 5,415,376 relates to a mechanism of making the valve rod move in an inclining way when the valve body opens and closes the opening of the vacuum process chamber. Namely, in the gate valve of the above U.S. Pat. No. 5,415,376, the valve rod is moved in an inclining way by spring action of a tension spring, however, when using the tension spring, a point contact at fixed portions at both ends becomes inevitable, so stress intensifies to the points and the fixed portion of the spring is liable to be damaged due to fatigue.

SUMMARY OF THE INVENTION

An object of the present invention is to provide a gate valve capable of not making any noise and preventing rocking even when driven at a high speed and having an excellent durability.

[1] To attain the above object, according to a first aspect of the present invention, there is provided a gate valve comprising a valve body (2) capable of opening and closing an opening of a sealed chamber, and capable of sealing the opening by inclination with respect to the opening; a valve rod (6) to one end portion of which said valve body is fixed, held so that it can move in a straight-move direction for the valve body to open and close the opening, and held so that it can incline about an inclination axis (41a); a regulation means (12) for regulating a straight movement in the direction of closing the opening of the valve body at a close position where the valve body closes the opening; a cam mechanism (31) connected to the other end portion of the valve rod outside the sealed chamber, for moving the valve rod straight by a supplied straight-move force, converting the supplied straight-move force to an inclination force and inclining about the inclination axis the valve rod wherein a straight movement is regulated at the close position toward the direction that the valve body seals the opening; and a drive means (60) for supplying the straight-move force to the cam mechanism; and wherein the valve rod is held so that it can move in a straight-move direction of opening and closing the opening via a pair of linear guides (48, 48) provided on both sides of the valve rod.

In the gate valve of the present invention, since a valve rod can be moved in a straight-move direction in a state of holding both ends of the valve rod by using a pair of linear guides, a conventionally required clearance disappears, consequently, it can attain silence even when the gate valve is driven at a high speed and rocking of the valve rod can be also prevented.

Note that in the above invention, the above linear guide (48) may be configured to have a guide body (44) being attached on the valve rod side, a guide rail (45) attached on the drive means side, and a rolling bearing (46) provided between the guide body and the guide rail.

Also, in the above invention, a inclination axis (41a) of the valve rod may be set on or near a straight line connecting to attaching portions of guide bodies of the pair of linear guides and the valve rod.

Furthermore, in the above invention, the inclination axis (41a) of the valve rod may be set on an axis line of the valve rod.

Also, in the above invention, a thrust bearing (42) can be provided at an attaching portion of the valve rod and the guide body of the linear guide.

Also, in the above invention, the valve rod (6) may be configured to be held by sandwiching by receiving a preload in the inclination axis (41a) direction from the pair of linear guides (48, 48).

Furthermore, in the above invention, a sealing means (10) for sealing between the valve rod and the airtight chamber may be further provided so that the valve rod can move.

Also, in the above invention, the thrust bearing may be attached to the guide body by a bearing holding member (43) and the bearing holding member may be shaped to be received in a concave portion (12a) formed on a stopper member.

[2] To attain the above object, according to a second aspect of the present invention, there is provided a gate valve comprising a valve body (2) capable of opening and closing an opening of a sealed chamber, and capable of sealing the opening by inclination with respect to the opening; a valve rod (6) to one end portion of which the valve body is fixed, held so that it can move in a straight-move direction for the valve body to open and close the opening, and held so that it can incline about an inclination axis (41a); a regulation means (12) for regulating a straight movement in the direction of closing the opening of the valve body at a close position where the valve body closes the opening; a cam mechanism (31) connected to the other end portion of the valve rod outside the sealed chamber, for moving the valve rod straight by a supplied straight-move force, converting the supplied straight-move force to an inclination force and inclining about the inclination axis the valve rod wherein a straight movement is regulated at the close position toward the direction that the valve body seals the opening; and a drive means (60) for supplying the straight-move force to the cam mechanism; and wherein the cam mechanism (31) comprises a rolling body (35); a rolling body holding member (38) for holding the rolling body and being driven by the drive means a cam member (32) arranged facing to the rolling body holding member, provided with a cam plane for the rolling body to roll thereon to incline the valve rod, and connected to the valve rod; and further comprising a compression coil spring (80) for maintaining a relative positional relationship of the rolling body holding member and the cam member constant while elastically permitting a change of a relative position of the rolling body holding member and the cam member.

In the gate valve of the present invention, since a compression coil spring is used in a cam mechanism to incline the valve rod, the spring can contact the valve rod which relatively inclines and the gate valve fixed side by a plane. As a result, it is possible to provide a gate valve capable of dispersing the elastic stress imposed on the contact portion of the spring and preventing breaks due to fatigue as a result of repeated drive, and having excellent durability.

Note that in the above invention, the compression coil spring (80) may be configured to be attached in a non-load state to an offset state so that a reactive force by the offset acts to recover the valve (2) to an initial position direction via a relative move of the rotation body holding member (38) and the cam (32).

Also, in the above invention, the compression coil spring (80) may be provided so as to surround the rotation body holding member (38) and the cam (32).

Furthermore, in the above invention, the rotation body (35) may be configured to comprise a roller (35a) having a rotation plane contacting the cam surface and a roller shaft (35b) for rotatably supporting the roller rotatably and being supported by the rotation body holding member.

Also, in the above invention, a sealing means (10) for sealing between the valve rod and the airtight chamber so that the valve rod can move may be further provided.

BRIEF DESCRIPTION OF THE DRAWINGS

These and other objects and features of the present invention will be explained more in detail below with reference to the attached drawings, in which:

FIG. 6A to FIG. 6C are cross-sectional views for explaining an operation of the gate valve of the first embodiment;

DESCRIPTION OF THE PREFERRED EMBODIMENTS

Figure 8:
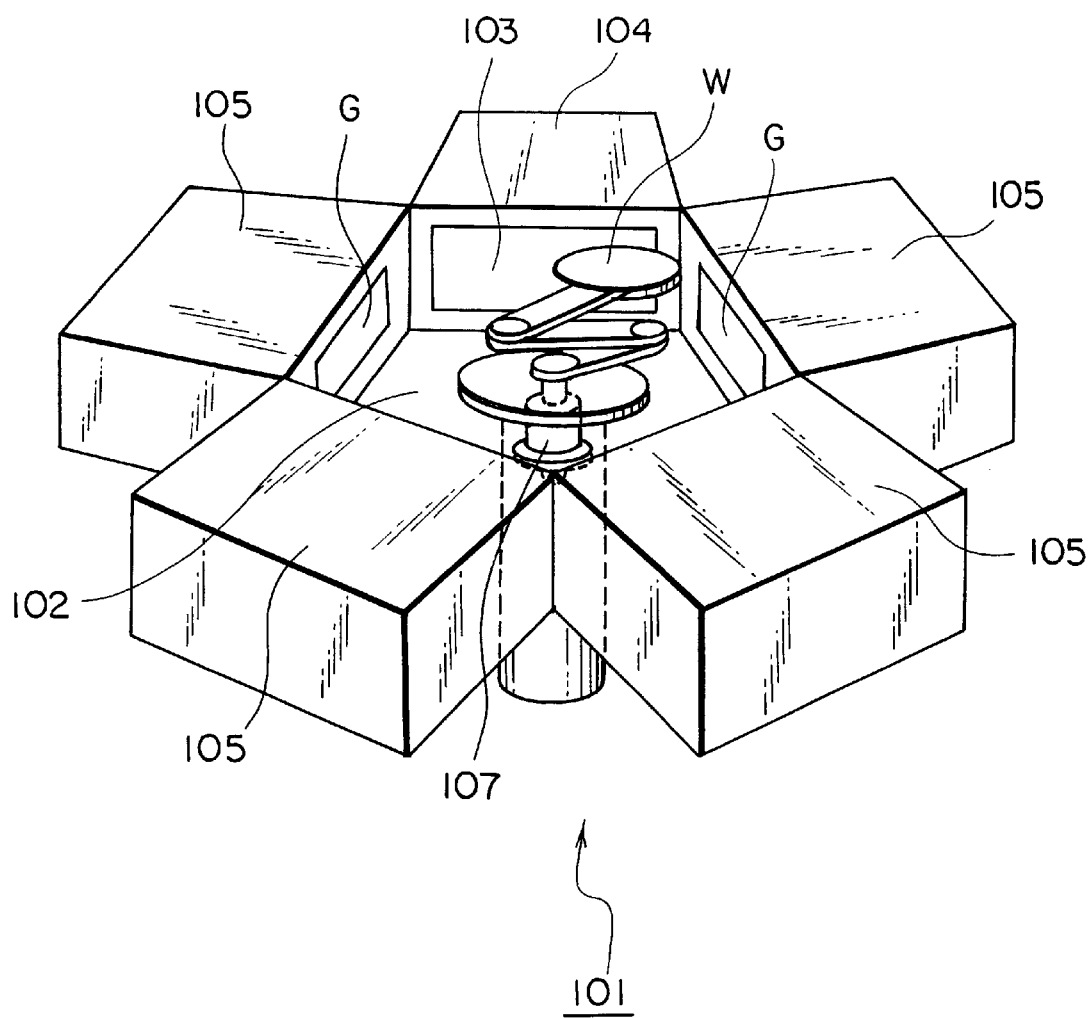
FIG. 8 is a perspective view of an example of a vacuum process apparatus to which the gate valve of the present embodiment is applied.

A gate valve of the present embodiment can be applied, for example, to a vacuum process apparatus 101 shown in FIG. 8. In the vacuum process apparatus 101 shown in FIG. 8, a wafer W to be processed is transferred to a transport chamber 102 from a transport inlet 103 of a transport path 104 by using a not illustrated transport device and held by a vacuum transport robot 107 provided in the transport chamber 102. When the water W is held by the vacuum transport robot 107, the transport inlet 103 is closed and vacuum drawing is performed in the transport chamber 102. At this time, the gate valves are in a state of airtightly sealing each gate G.

When the vacuum drawing in the transport chamber 102 is completed, the gate valves are driven to open the gates G and the wafer W is transported to a predetermined vacuum process chamber 105 by the vacuum transport robot 107. At this time, each gate valve is driven to open the gate G to perform processing in the vacuum process chamber 105 and a predetermined processing is performed on the wafer W.

When predetermined processing on the wafer W is completed, the gate valve is driven to open the gate G, the wafer W is again taken out from the vacuum process chamber 105 by the vacuum transport robot 107 and automatically transported from the transport inlet 103 to outside the vacuum process apparatus 101.

Below, a gate valve according to the present embodiment for airtightly opening and closing the gate G of the vacuum process device 101 will be explained with reference to FIG. 1 to FIG. 6C. Note that an upper portion than a substrate 52 in FIG. 1 and FIG. 7 corresponds to the vacuum process chamber 105 in FIG. 8 and a lower portion than the substrate 52 corresponds to outside the vacuum process chamber 105 in FIG. 8. The outside the vacuum process chamber is indicated by a reference number 108.

First Embodiment

Figure 1:
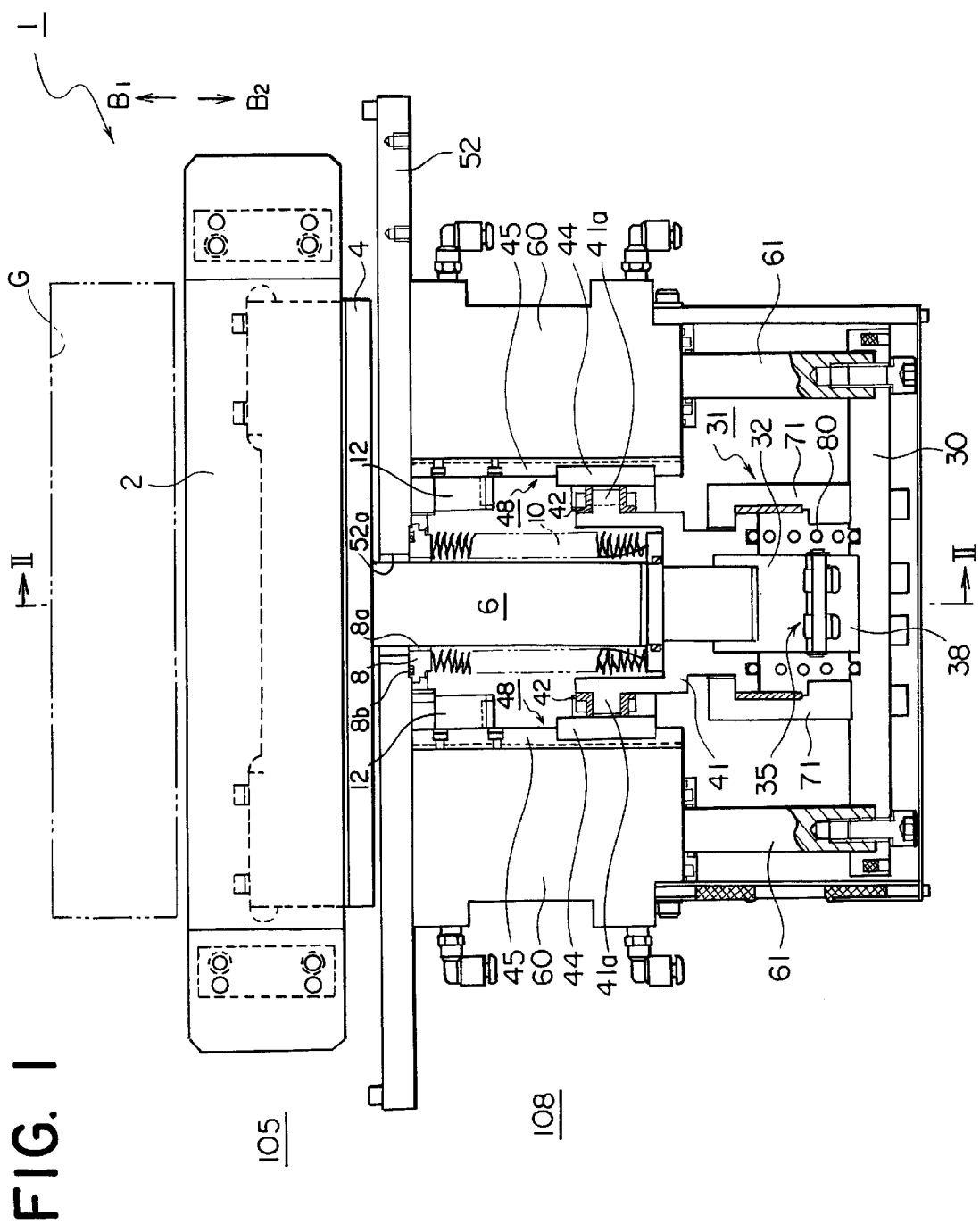
FIG. 1 is a view from the front of a gate valve a part of which is cut of a first embodiment of the present invention.
Figure 2:
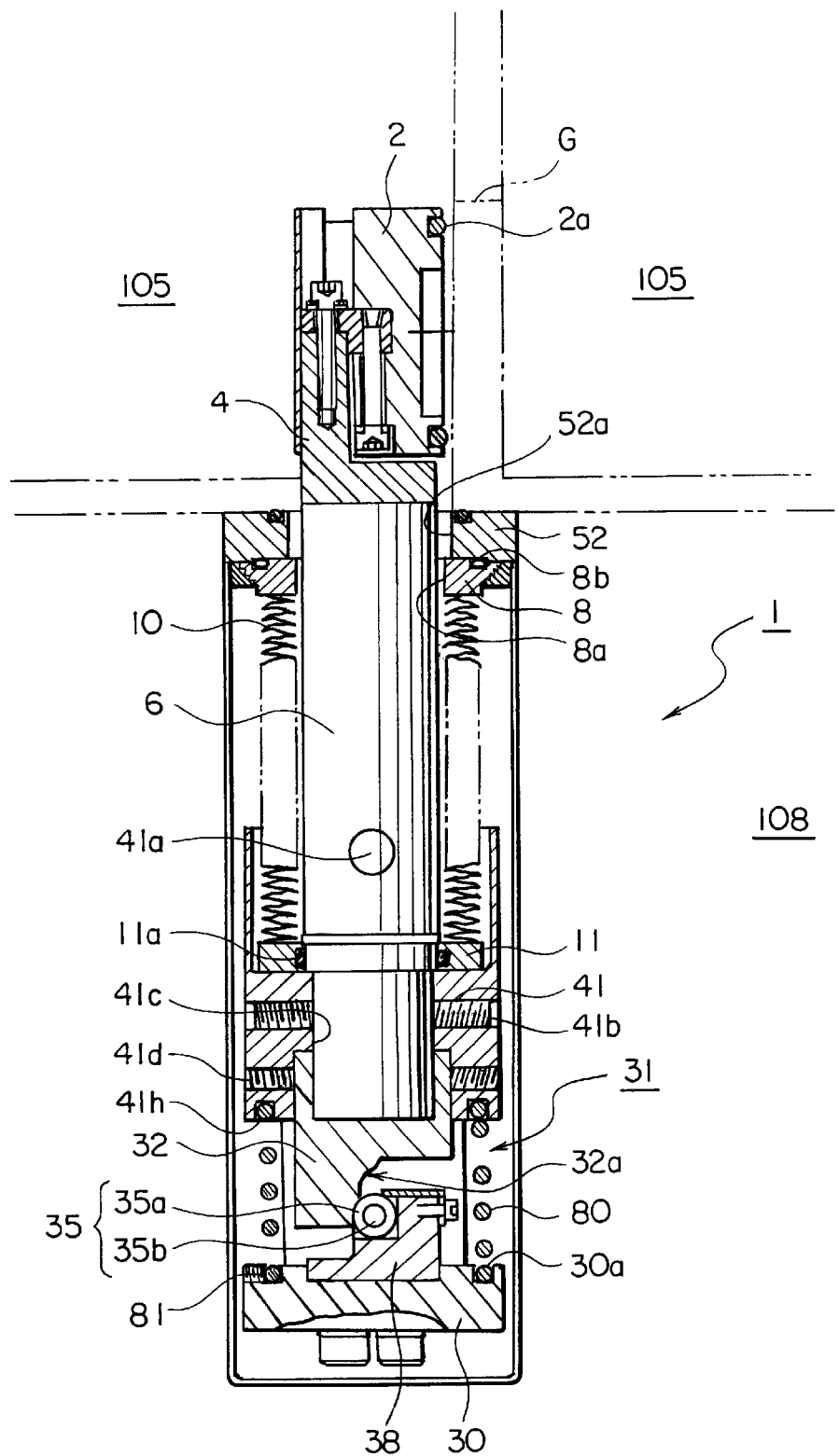
FIG. 2 is a cross-sectional view along the line II—II in FIG. 1.

The gate valve 1 of the first embodiment shown in FIG. 1 and FIG. 2 comprises a valve body 2, a valve rod 6 connected to the valve body 2 by a connection member 4, a seal bellows 10, a linear guide 48, a cam mechanism 31 and a pair of air cylinders 60 and 60. Here, the seal bellows 6 corresponds to the sealing means of the present invention and the air cylinders 60 correspond to a specific example of a drive means of the present invention.

The valve body 2 is formed by a flat plate-like member, capable of opening and closing the gate G of the vacuum process chamber 105 and sealing the gate G via an O-ring 2a by inclining with respect to the gate G. Note that the O-ring 2a is fitted in a drop prevention groove 2b formed on the valve body 2.

Note that in the present embodiment, a flat plate-like member was used as the valve body 2, but when the gate G has a curved shape, the shape may be made appropriately in accordance thereto. Also, when using as a gate valve in a semiconductor manufacturing process, a material composing the valve body 2 is preferably a metal material, etc. which does not generate particles much at all and does not discharge any gas or the like.

The valve body 2 is screwed by a bolt via the connection member 4 at one end of the valve rod 6 and is provided so as to projecting from an insertion hole 52a of an attachment substrate 52 of the vacuum process chamber 105 and an insertion hole 8a of a fixed ring 8 attached to the attaching substrate 52 via the O-ring 8b to outside the vacuum process chamber 108.

The holding member 41 is connected at the other end of the valve rod 6 by welding, etc. and supports the same. A detailed explanation will be given later on but the holding member 41 is configured to be rotatable about an inclination axis 41a, so the valve rod 6 is also capable of inclining about the inclination axis 41a. Note that when using as a gate valve in a semiconductor manufacturing process, a material composing the valve rod 6 is preferably a metal material, etc. which does not generate particles much at all and does not discharge any gas or the like.

The seal bellows 10 is a metal member for sealing between the vacuum process chamber 105 side and the valve rod 6 and is capable of expanding and contracting in accordance with a straight move and inclining move of the valve rod 6. One end of the seal bellows 10 is fixed by a bonding means, for example welding, to a fixing ring 8 fixed to a lower portion of the substrate 58 via the O-ring while keeping the sealed state. The other end of the seal bellows 10 is fixed by a bonding means, for example by welding, to a fixing ring 11 fixed by being fitted in the valve rod 6. Note that the O-ring 11a is provided between the fix ring 11 and the valve rod 6, consequently, the vacuum process chamber 105 can be sealed even when the valve rod 6 moves straight or inclines, so contaminants such as particles from the outside can be prevented from entering.

The holding member 41 has a cylindrical shape, which receives the seal bellows 10 at an upper portion of one end thereof, and inclination axises 41a are respectively formed at positions facing to each other on an outer circumference on both sides thereof. Furthermore, a bottom portion for receiving the seal bellows 10 is formed an insertion hole 41c for being fitted the valve rod 6 therein, and the valve rod 6 is fixed by a screw 41b shown in FIG. 2.

Figure 3:
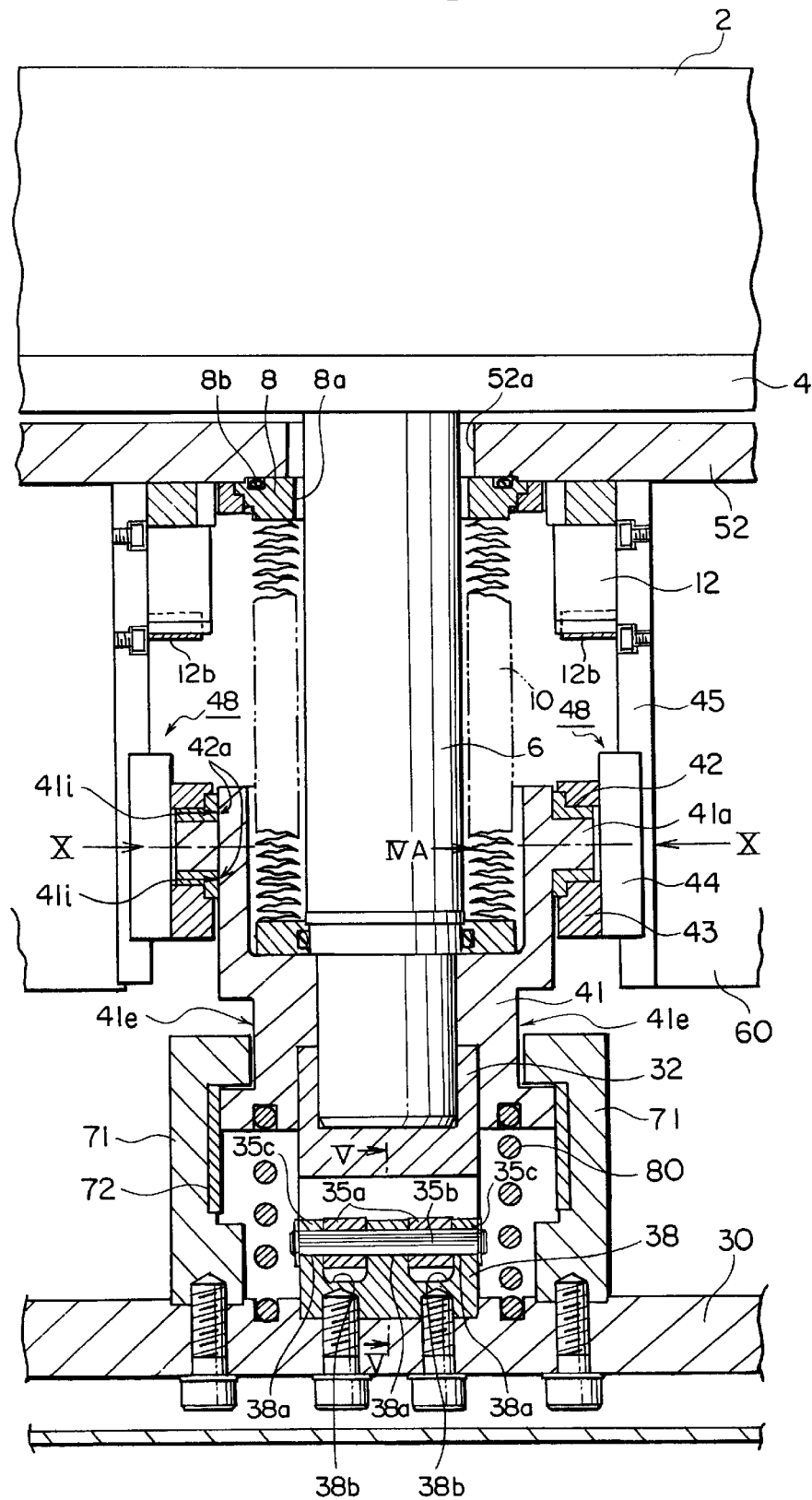
FIG. 3 is cross-sectional view of an enlarged key portion of the gate valve in FIG. 1.
Figure 4A:
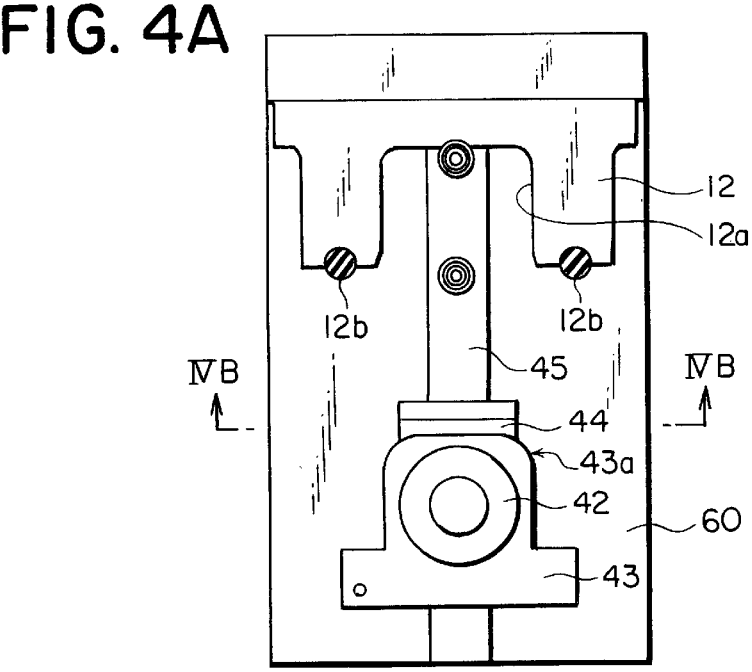
FIG. 4A is an IVA perspective view of FIG. 3
Figure 4B:
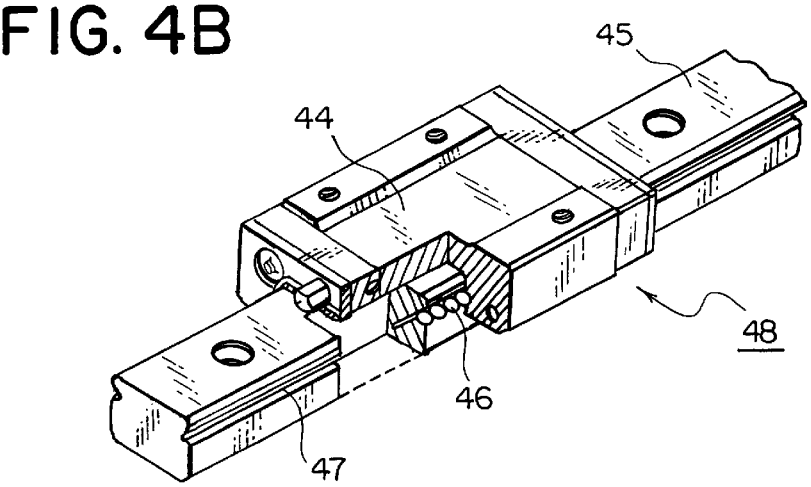
FIG. 4B is a cross-sectional view along the line IVB—IVB in FIG. 4A

Enlarged views of the structure of connecting the holding member 41 and the linear guide 48 are shown in FIG. 3, FIG. 4A and FIG. 4B.

Two inclination axises 41a and 41a formed on the holding member 41 are attached a non-lubricity type thrust bearing 42 made by copper based oilbearing material, and thereby, the holding member 41 is capable of inclining about the inclination axis 41a and the valve rod 6 is also capable of inclining with this. Also, since a oilbearing material is used, it is free from maintenance.

The thrust bearing 42 for rotatably holding the inclination axis 41a is connected to a guide body 44 by a bolt, etc. via a bearing attachment member 43. Also, the guide body 44 is formed a groove 47 on a guide rail 45 provided along the straight-move direction of the valve rod 6 on facing sides of the two air cylinders, and the guide body 44 is movably held as a result that the rolling bearing 46 fits in the groove 47.

Furthermore, the holding member 41 is attached by receiving a preload from the guide rail 45 on both sides to a direction X of the inclination axis 41a. Here, the preload in the X direction means to assemble so that an upper surface 42a of the thrust bearing 42 and a surface 41i around the inclination axis 41a of the holding member 41 are closely contact. Specifically, it can be adjusted at the time of mounting on the substrate 52 two air cylinders 60 and 60 being attached the linear guides 48, respectively. Due to this, rattling in the direction of the inclination axis 41a and the straight-move direction disappears between the holding member 41 and the linear guide 48, and the holding member 41 and the valve rod 6 can smoothly move along the straight-move directions B1 and B2.

Figure 4C:
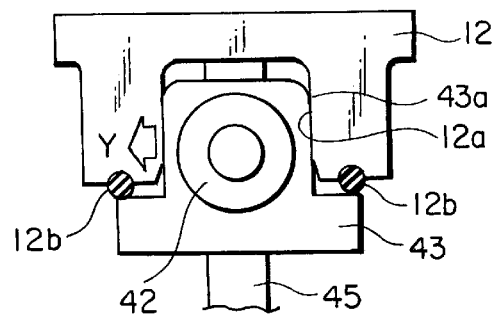
FIG. 4C is a view of FIG. 4A at the time of regulation.

Stopper member 12 is provided at the upper end of the rail 55. Note that the stopper member 12 corresponds to one specific example of a regulation means of the present invention. The stopper member 12 regulates a straight movement of the holding member 41 (the valve rod 6) by contacting a bearing holding member 43 of the thrust bearing 42 when the valve body 2 moves to the straight-move direction B1, that is, moves straight in the direction of closing the gate G. At the time of the regulation, as shown in FIG. 4C, as a result that the bearing holding member 43 contacts a urethane rubber buffer member 12b fitted in a concave portion of the stopper member 12, impacts and vibrations are eased. Note that to further ease the impact caused by collision with the bearing holding member 43, the stopper member 12 may be formed for example by an elastomer.

Also, when the bearing holding member 43 contacts the stopper member 12 and the valve body 2 closes the gate G, a stress is imposed on the bearing holding member 43 in the direction shown by an arrow Y in FIG. 4C. When the stress is received only by the linear guide 48, durability of the linear guide 48 becomes short. Therefore, in the present example, by forming the stopper member 12 to be a concave shape 12a and forming the bearing holding member 43 in a convex shape 43a so that it can be housed in the concave portion 12a, the stress in direction of the arrow Y imposed on the bearing holding member 43 at the time when the valve body 2 closes the gate G is received by the bearing holding member 43 and the stopper member 12. Consequently, an excessive load is not imposed on the linear guide 48 and the durability improves.

Returning to FIG. 1, the air cylinders 60 and 60 are screwed by bolts and fixed to outside the vacuum process chamber 108 of the substrate 52 and arranged at symmetric positions with respect to the valve rod 6. The air cylinder 60 has therein a piston rod 61 for extending and contracting by a compression air. An end of the piston rod 61 is fixed to a connection plate 30. The piston rod 61 of the air cylinder 60 expands and contracts in the straight-move directions B1 and B2, and thereby, the connection plate 30 also moves straight in the straight-move directions B1 and B2.

Two engagement members 71 and 71 are fixed to the connection plate 30 by bolts. The engagement members 71 are arranged to fit in grooves 41e formed along the straight-move directions B1 and B2 on both sides of an outer circumference of the holding member 41 as shown in FIG. 3. the two engagement members 71 pull the holding member 41 in the straight-move direction B2 by engaging with a lower end portion of the groove 41e at the time when the connection plate 30 moves in the straight-move direction B2, that is when the valve body 2 moves straight to the direction to open the gate G, while it permits a relative move of the holding member 41 and the connection plate 30 in a certain range, that is, a move amount by a later explained cam mechanism 31 when the connection plate moves to the direct-move direction B1, that is when the valve body 2 moves straight to the direction to close the gate G to seal. In FIG. 3, the reference number 72 indicates a non-lubricity type oilbearing bearing made by a copper based oilbearing material, which smooths sliding at the time of relative movements of the holding member 41 and the engagement member 71.

The cam mechanism 31 is provided between the above holding member 41 and the connection plate 30, moves straight the valve rod 6 by a straight-move force supplied from the air cylinder 60 through the connection plate 30, makes the valve rod 6 whose straight-move is regulated by the above stopper member 12 incline about the inclination axis 41a toward the direction that the valve body 2 seals the gate G at a closed position where the valve body 2 closes the gate G by converting the supplied straight-move force to an inclination force.

Figure 5A:
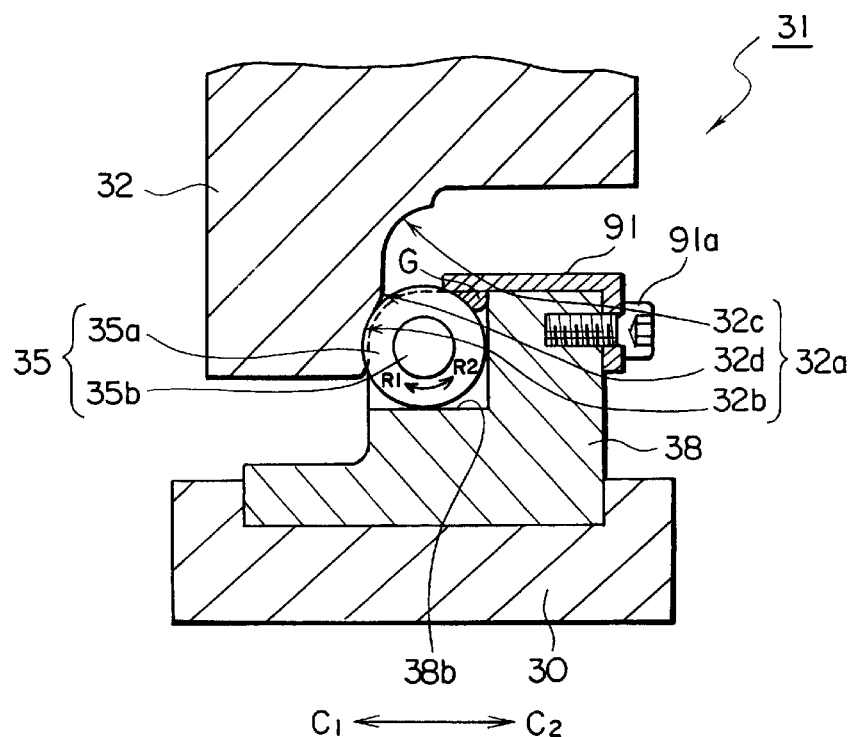
FIG. 5A and FIG. 5B are cross-sectional views along the line V—V in FIG. 3.
Figure 5B:
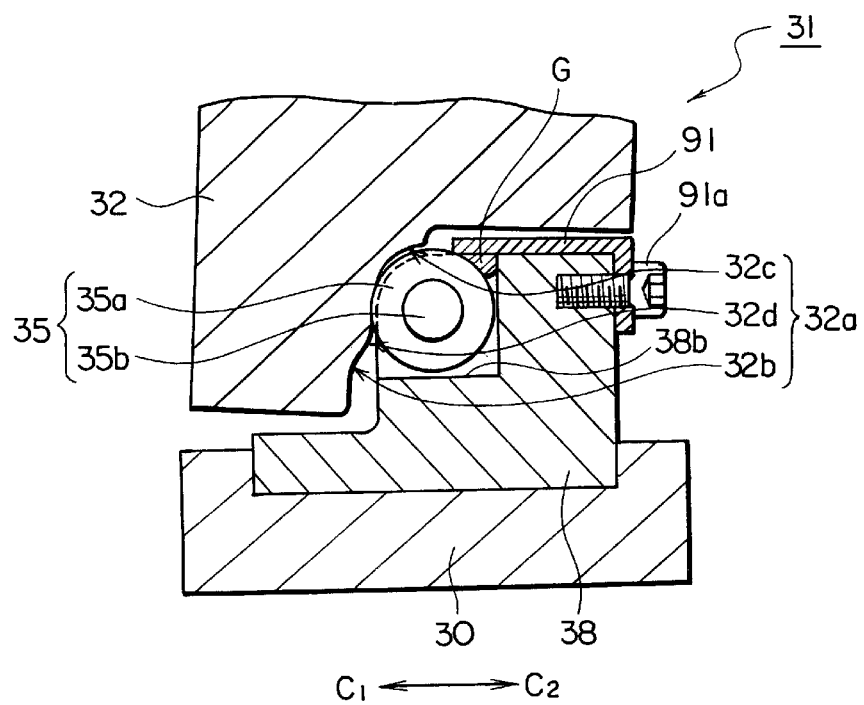

FIGS. 5A and 5B are cross-sectional views of the specific configuration of the cam mechanism 31. In the figures, the cam mechanism 31 comprises a cam member 32 fixed to a lower end of the holding member 41 by a screw 41d (refer to FIG. 2), a roller member 35 composed of a roller 35a and a roller shaft 35b, a roller holding member 38 fixed to the connection plate 30 at a position facing to the cam member 32, a compression coil spring 80 for connecting the holding member 41 and the connection plate 30, and a lubricant holding member 91 provided to the roller holding member 38. Here, the roller member 35 corresponds to a specific example of a rotation body of the present invention and the roller holding member 38 corresponds to that of a rotation body holding member of the present invention, respectively.

The cam member 32 is provided with a cam plane 32a of a predetermined shape formed by a smooth continuous curved planes. The cam plane 32a of the present example is formed by two concave shaped curved planes 32b and 32c capable of holding the roller 35a and a convex shaped curved plane 32d between them. One concave shaped curved plane 32b receives the roller 35a when the valve rod 6 moves along the straight-move direction B1 or B2, while the convex shaped curved plane 32d and the other concave shaped curved plane 32c generate an inclination force required by the valve rod 6 and the holding member 41 from the roller 35a rolling on curved planes thereof when the valve rod 6 moves to the straight-move direction B1 and reaches a limit position.

Namely, as a result that the roller 35a moves by rolling on the cam plane 32a, a relative positional relationship of the straight-move directions B1 and B2 in the cam member 32 and the roller holding member 38 changes and a relative positional relationship of inclination directions C1 and C2 changes. Consequently, the valve rod 6 moves straight while inclines about the inclination axis 41a of the holding member 41. A detailed explanation on the operation will be further made later on.

Particularly, the roller member 35 of the present embodiment comprises two rollers 35a and one roller shaft 35b as shown in FIG. 3, FIG. 5A and FIG. 5B.

The roller shaft 35b is formed by a cylinder body and freely rotatably supported by the roller holding member 38. Also, at both ends in the axis direction of the roller shaft 35b are fitted ring members 35c. As a result that the ring members 35c engage with the roller holding member 38, the roller shaft 35b is held in a state that movement in the axis direction with respect to three-point holding plane 38a of the roller holding member 38 is regulated.

On the other hand, the two rollers 35a are also made by a cylinder body, freely rotatably supported by the roller shaft 35b, and provided to a concave portion 38b of the roller holding member 38 in a noncontact way. The roller 35a is provided with a rolling plane formed by the cylinder plane, and the rolling plane rolls on the cam plane 32a of the above cam member 32, furthermore, an inner plane of the roller 35a slides on the roller shaft 35b while rolling. Also, when the rolling plane of the roller rolls on the cam plane 32a of the cam member 32, the roller shaft 35b also slides on a supporting portion of the roller holding member 38 while taking the same together.

Namely, since the roller member 35 of the present embodiment is provided with two sliding planes, which are an inner plane of the roller 35a and an outer plane of the roller shaft 35b, even when one sliding plane does not smoothly rotate, smooth rotation can be attained by the other sliding plane. Thus, sliding of the roller 35a and the cam member 32 can be prevented and a rotation movement can be ensured.

Note that since a heavy load is imposed to the roller member 35, a relatively strong and hard-wearing metal material is desirably used for the roller 35a and the roller shaft 35b.

The lubricant holding member 91 is formed by polyacetal and other resin material, composed of a member having an approximately L-shaped section, and fixed by a bolt 91a to the roller holding member 38 via a through hole formed on one side of the L-shaped member. One end of other side of the L-shaped member extends so as to face a part of the rolling plane of the roller 35a, and in a clearance formed between one end thereof and the rolling plane of the roller 35a, a lubricant G is held by the lubricant holding member 91. Thereby, the lubricant G held in the clearance is prevented from being adhered on the rolling plane of the roller 35a by a large amount and transferred when the roller 35a rotates in the direction of an arrow R2 shown in FIG. 5A. Namely, the lubricant holding member 91 regulates an adhesion amount of the lubricant G to be adhered to the rolling plane of the roller 35a so as to function to keep the adhesion amount constant.

Note that as the lubricant G, for example grease made by a semi-solid lubricant is used. Namely, by using a lubricant G in a state between a liquid and a solid, it becomes easy to be held in the clearance between an end of the lubricant holding member 91 and the rolling plane of the roller 35a.

Returning to FIG. 1 and FIG. 2, one end of the compression coil spring 80 is fixed to a fixing groove 41h formed at an end portion of the holding member 41 and the other end is fixed by fitting in a fixing groove 30a formed on the connection plate 30 and furthermore fixed by a screw 81. Also, the compression coil spring 80 is provided so as to house the cam member 32 and the roller holding member 38 therein.

By directly connecting the connection plate 30 and the holding member 41, a stress of the compression coil spring 80 in the straight-move direction acts in the direction of separating the cam member 32 and the roller holding member 39. As a result, the compression coil spring 80 elastically permits changes of relative positions of the cam member 32 and the roller holding member 38 while functioning to maintain the relative positional relationship of the cam member 32 and the roller holding member 38 constant.

Furthermore, in the present embodiment, as shown in FIG. 2, in a plan view wherein the inclination axis 41a becomes at right angles with the paper surface, the compression coil spring 80 is provided between the holding member 41 and the connection plate 30 in an offset state from a shape of a non-load state. In the example in FIG. 2, an end portion on the connection plate 30 side of the compression coil spring 80 is attached so as to be closer to the right side with respect to an end on the holding member 41 side. By arranging the compression coil spring 80 in the offset way, the stress acts between the holding member 41 and the connection plate 30, so acts in the direction of making the cam member 32 and the roller holding member 38 (further, the roller 35a) closely contact. As a result, even when the roller 35a rolls on the cam plane 32a of the cam member 32, a clearance does not appear between the roller 35a and the cam plane 32, so vibration and noise can be prevented. Also, in the state where the gate G is closed by the valve body 2, an offset amount of the compression coil spring 80 becomes maximum and the above stress also becomes maximum. Thus, when the valve body 2 opens the gate G, a stress from the compression coil spring 80 in the direction of opening the valve body 2 also acts in addition to a drive force of the air cylinder 60. As a result, an opening operation can be smoothly conducted even if the valve body 2 adheres to the gate G due to a vacuum pressure, etc.

Next, an operation of the gate valve 1 having the above configuration will be explained.

FIG. 6A is a view of a state where the gate valve 1 fully opened the gate G, FIG. 6B is a view of a state where the valve body 2 of the gate valve 1 reached an upper dead point of the straight-move direction B1 to get close to the gate G, and FIG. 6C is a view of a state where the gate valve 1 fully closed the gate G. Note that in the fully closed state shown in FIG. 6C, the roller 35a contacts the cam plane 32b of the cam member 32.

First, when closing the gate G from the fully opened state shown in FIG. 6A, the connection plate 30 is drawn to the straight-move direction B1 by driving the air cylinder 60. Thereby, the valve body 2 moves to a position of closing the gate G toward the straight-move direction B1 as shown in FIG. 6B, but does not seal the gate G.

When the valve body 2 moves toward the straight-move direction B1, the roller 35a moves to the straight-move direction B1 by an elastic force of the compression coil spring 80 while maintaining the state of contacting the cam plane 32b of the cam member 32 in a state where two engagement members 71 shown in FIG. 3 are engaged with a lower end of the groove 41e of the holding member 41.

When moving to the straight-move direction B1, the holding member 41 holding the valve rod 6 moves by being guided by the linear guides 44 and 45 supported by the inclination axis 41a. But the linear guide of the present example has a rolling bearing 46 between the guide body 44 and the guide rail 45, moreover, the two inclination axises 41a are supported by being sandwiched by preloads of the linear guides 44 and 45. Thus, there arises no rattling between the inclination axis 41a, the guide body 44 and the guide rail 45, so a smooth and silent move can be attained and no rocking occurs by jamming the guide body 44 into the guide rail 45. It is particularly advantageous when moving the valve rod 6 at a high speed.

When the valve rod 6 reaches the position shown in FIG. 6B, the bearing holding member 43 supporting the thrust bearing 42 of the inclination axis 41a of the holding member 41 contacts the stopper member 12, and the straight movement of the valve rod 6 and the holding member 41 in the straight-move direction B1 is regulated.

When a straight-move force is further supplied from the air cylinder 60 to the state where the straight move of the valve rod 6 and the holding member 41 shown in FIG. 6B in the straight-move direction B1, the cam mechanism 31 operates and, as shown in FIG. 6C, the valve rod 6 inclines to the direction that the valve body 2 seals the gate G.

An operation of the cam mechanism 31 at this time will be explained with reference to FIG. 5A and FIG. 5B. When the roller holding member 38 is further pushed by the air cylinder 60 in the straight-move direction B1 from the state where the straight move of the valve rod 6 and the holding member 41 in the straight-move direction B1, as shown in FIG. 5A, the roller 24a held by the roller holding member 38 resists against the elastic force of the compression coil spring 80 and starts to roll from the concave cam plane 32b to the convex can plane 32d of the cam member 32.

When the roller 35a starts to roll from the concave plane cam plane 32b to the convex cam plane 32d of the cam member 32, the roller 35a rolls in the direction of an arrow R2 shown in FIG. 5A with respect to the roller shaft 35b and also takes therewith the roller shaft 35b in the same direction with respect to a holding plane 38a of the roller holding member 38. At this time, even if lubricity is declined either between the roller 35a and the roller 35b or between the roller shaft 35b and the holding plane 38a of the roller holding member 38, as a result that the other slides, the roller 35a is able to roll on the cam plane 32a and does not slide.

Note that when the roller 35a rotates in the direction of an arrow R2, the lubricant G held between the lubricant holding member 91 and the rolling plane of the roller 35a is applied to the rolling plane of the roller 35a, and an amount of the lubricant G to be applied is limited to be substantially constant due to an action of the lubricant holding member 91.

As shown in FIG. 5B, when the roller 35a rolls up to the concave cam plane 32c from the convex cam plane 32d of the cam member 32, the compression coil spring 80 is compressed with respect to the straight directions B1 and B2, and further deforms in the inclination directions C1 and C2 of the valve rod 6. Then, a recovery force of the compression coil spring 80 acts in the straight-move direction B1 and B2 and the inclination directions C1 and C2 between the connection plate 30 and the holding member 41. At this time, straight movement of the valve rod 6 and the holding member 41 in the straight-move direction B1 is limited, while the two engagement members 71 and 71 shown in FIG. 3 move along the grooves 41e and 41e on the holding member 41 and straight movement thereof in the straight-move direction B1 is permitted.

On the other hand, when the roller 35 rolls from the cam plane 32d to the concave cam plane 32c of the cam member 32, as shown in FIG. 6C, the valve rod 6 inclines by rotating about the inclination axis 41a, the O-ring 2a provided on the valve body 2 is pressed against an outer circumference of the gate G, and the O-ring 2a is squashed. As a result of the above operations, sealing of the gate G of the vacuum process chamber 105 by the valve body 2 is completed.

On the other hand, an operation of opening the gate G of the vacuum process chamber 105 is driven in an opposite way to the above, that is, conducted by expanding the piston rod 61 from the air cylinder 60.

When a straight-move force of the air cylinder 60 in the direction that the valve body 2 seals the gate G is released from the valve rod 6, a recovery force of the compression coil spring 80 acts and the roller 35a rolls on the convex cam plane 32c from the state of being on the concave cam plane 32c of the cam member 32 to be again held by the concave cam plane 32b and the valve rod 6 stands upright. At this time, the roller 35a rotates about the roller shaft 35b in the opposite direction R1 to the above arrow R2, and the lubricant G adheres on the rolling plane of the roller 35a.

As explained above, in the gate valve 1 according to the present embodiment, since the valve rod 6 is held movable in the straight-move directions B1 and B2 to open and close the opening G via a pair of linear guides 48 and 48 provided on both sides of the valve rod 6, it is free from maintenance and maintenance work becomes unnecessary. Also, since being held movable in the straight-move directions B1 and B2 by the linear guide 48 provided with the rolling bearing 46 and supporting the valve rod 6 by sandwiching by imposing a preload, rattling does not occur between the linear guide 48 and the valve rod 6, vibration and noise can be suppressed, and the linear guide 48 does not suffer from rocking even if an unexpectedly large moment acts on the valve body 2. The effects becomes remarkable particularly when driving the gate valve at a high speed and when applying the valve rod 6 to a horizontal drive gate valve which drives in a horizontal direction.

Also, in the gate valve according to the present embodiment, by applying a compression coil spring 80 for keeping relative positional relationship of the roller holding member 38 and the cam member 32 constant while elastically permitting a change of a relative position of the roller holding member 38 and the cam member 32, an attachment area can be set large and the durability is improved by preventing a stress from intensifying. Furthermore, because of the compression coil spring 80, the structure of housing the cam member 32 of the gate valve therein can be attained, so the number of parts can be reduced and assembling work performance is also improved.

Note that in the above embodiment, it was configured that the cam member 32 was connected to the valve rod 6 (holding member 41) to directly drive the roller holding member 38 by the air cylinder 60 via the connection plate 30, but it may be also configured, for example, that the roller holding member 38 is directly connected to the valve rod 6 (holding member 41) to directly drive the cam member 32 by the air cylinder 60.

Second Embodiment

Figure 7:
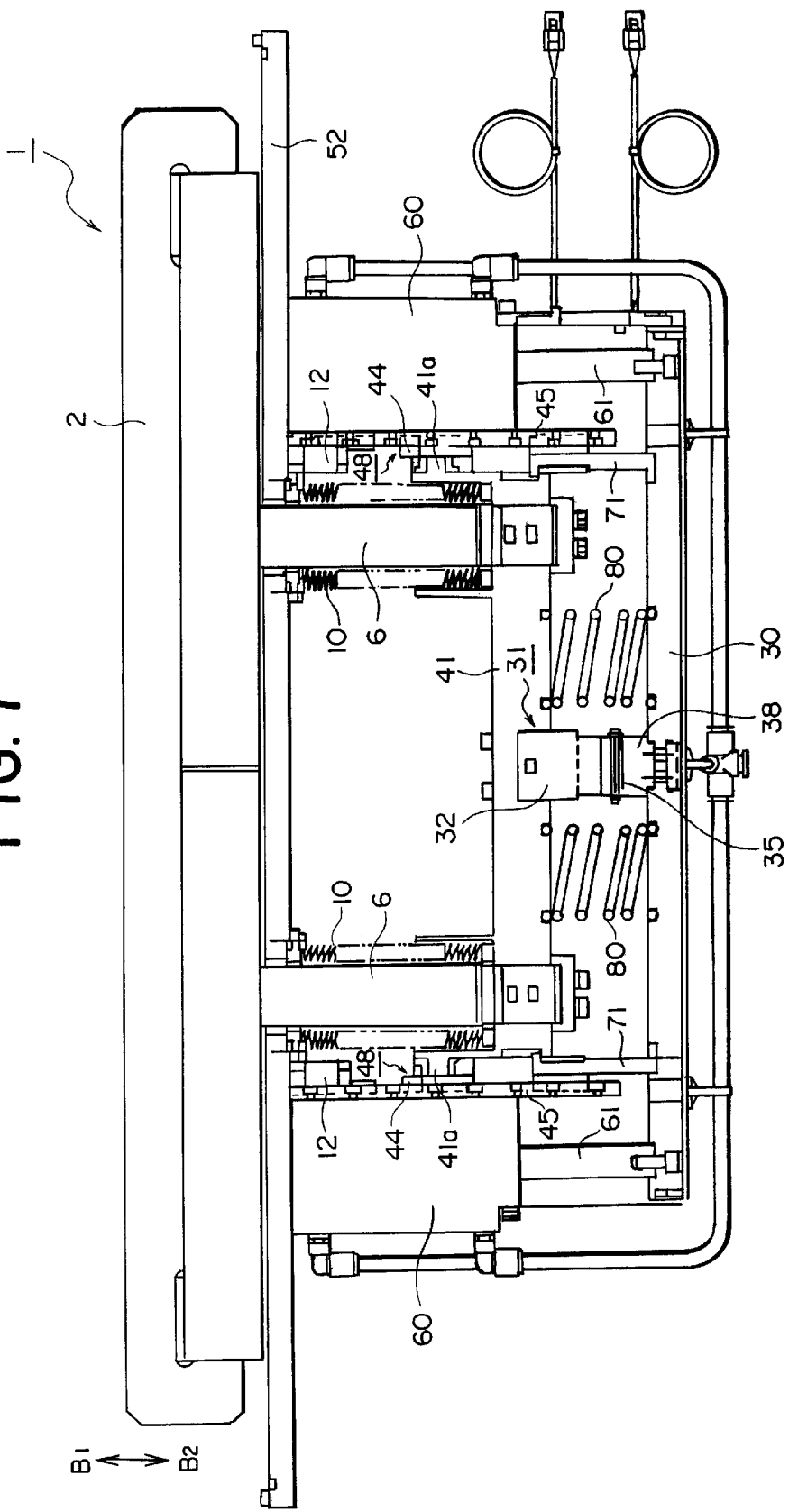
FIG. 7 is a view from the front of a gate valve a part of which is cut of a second embodiment of the present invention.

FIG. 7 is a view from the front of a gate valve according to another embodiment of the present invention wherein a part thereof is cut off, and the present embodiment is preferably applied to a wide valve body for opening and closing a wide opening G. The gate valve of the present embodiment differs from the one in the above first embodiment in a point that two valve rod 6, two seal bellows 10 and two compression coil spring 80 are provided. Basic configuration other than that is the same.

Namely, one valve body 2 formed to be wide is provided with two valve rods 6 and 6, and the seal bellows 10 and 10 for sealing between the vacuum process chamber 105 side and the respective valve rods 6 are also provided, respectively.

Lower ends of the valve rods 6 and 6 are respectively attached to a holding member 41 formed to be one body, and on both sides thereof are respectively formed inclination axises at positions facing to each other on an outer circumference. Note that the connection structure of the holding member 41 and a linear guide 48 is the same as in the above first embodiment.

At the center of the holding member 41 is attached a cam member 32 constituting a cam mechanism 31, and a roller holding member 38 is attached to a connection plate 30. Both sides of the cam mechanism 31 are provided with compression coil springs 80 and 80, which function to keep a relative positional relationship of the cam member 32 and the roller holding member 38 constant while elastically permitting a change of a relative position of the cam member 32 and the roller holding member 38 by directly connecting the connection plate 30 and the holding member 41.

Even the gate valve of the second embodiment configured as such is free from maintenance and maintenance work is unnecessary because the two valve rods 6 and 6 are held movable in the straight-move directions B1 and B2 for opening and closing the opening G via a pair of linear guides 48 and 48 provided on both sides of the valve rods 6 and 6. Furthermore, by holding movable in the straight-move directions B1 and B2 by the linear guides 48 having a rolling bearing and holding the valve rods 6 and 6 by imposing a preload, rattling between the linear guides 48 and 48 and the valve rods 6 and 6 disappears, vibration and noise can be suppressed, and rocking of the linear guides 48 does not occur even if an unexpectedly large moment acts on the valve body 2. The effects becomes remarkable particularly when driving the gate valve at a high speed and when applying it to a horizontal driving gate valve wherein the valve rods 6 and 6 are driven in the horizontal direction.

Also, in the gate valve according to the present embodiment, by applying the compression coil springs 80 and 80 for keeping a relative positional relationship of the roller holding member 38 and the cam member 32 constant while elastically permitting a change of a relative position of the roller holding member 38 and the cam member 32, an attachment area can be set large and the durability is improved by preventing a stress from intensifying.

Note that the embodiments explained above were described to facilitate the understanding of the present invention and not to limit the present invention. Accordingly, elements disclosed in the above embodiments include all design modifications and equivalents belonging to the technical field of the present invention.

What is claimed is:

1. A gate valve comprising:
   a valve body capable of opening and closing an opening of a sealed chamber, and capable of sealing the opening by inclination with respect to the opening;
   a valve rod to one end portion of which the valve body is fixed, held so that it can move in a straight-move direction for the valve body to open and close the opening, and held so that it can incline about an inclination axis;
   a regulation means for regulating a straight movement in the direction of closing the opening of the valve body at a closed position where the valve body closes the opening;
   a cam mechanism connected to the other end portion of the valve rod outside the sealed chamber, for moving the valve rod straight by a supplied straight-move force, converting the supplied straight-move force to an inclination force and inclining about the inclination axis the valve rod wherein a straight movement is regulated at the close position toward the direction that the valve body seals the opening; and
   a drive means for supplying the straight-move force to the cam mechanism,
   wherein the valve rod is held so that it can move in a straight-move direction of opening and closing the opening via a pair of linear guides provided on both sides of the valve rod.

2. The gate valve as set forth in claim 1, wherein the linear guide comprises each said body attached to the valve rod side, a guide rail attached to the drive means side, and a rolling bearing provided between the guide body and the guide rail.

3. The gate valve as set forth in claim 2, wherein the inclination axis of the valve rod is set on or near a straight line connecting attachment portions of the guide bodies of the pair of linear guides and the valve rod.

4. The gate valve as set forth in claim 1, wherein the inclination axis of the valve rod is set on an axis line of the valve rod.

5. The gate valve as set forth in claim 2, wherein a thrust bearing is provided at an attachment portion of the valve rod and the guide body of the linear guide.

6. The gate valve as set forth in claim 1, wherein the valve rod is held by being sandwiched by receiving a preload in the direction of the inclination axis from the pair of linear guides.

7. The gate valve as set forth in claim 1, further comprising a sealing means for sealing between the valve rod and the sealed chamber so that the valve rod can move.

8. The gate valve as set forth in claim 5, wherein the thrust bearing is attached to the guide body via a bearing holding member, and the bearing holding member is made to be a form of being received in a concave portion formed on a stopper member.

9. A gate valve comprising:
   a valve body capable of opening and closing an opening of a sealed chamber, and capable of sealing the opening by inclination with respect to the opening;
   a valve rod to one end portion of which the valve body is fixed, held so that it can move in a straight-move direction for the valve body to open and close the opening, and held so that it can incline about an inclination axis;
   a regulation means for regulating a straight movement in the direction of closing the opening of the valve body at a close position where the valve body closes the opening;
   a cam mechanism connected to the other end portion of the valve rod outside the sealed chamber, for moving the valve rod straight by a supplied straight-move force, converting the supplied straight-move force to an inclination force and inclining about the inclination axis the valve rod wherein a straight movement is regulated at the close position toward the direction that the valve body seals the opening; and
   a drive means for supplying the straight-move force to the cam mechanism,
   wherein the cam mechanism comprises
      a rolling body;
      a rolling body holding member for holding the rolling body and being driven by the drive means; and
      a cam member arranged facing to the rolling body holding member, provided with a cam plane for the rolling body to roll thereon to incline the valve rod, and connected to the valve rod; and
      further comprising a compression coil spring for maintaining a relative positional relationship of the rolling body holding member and the cam member constant while elastically permitting a change of a relative position of the rolling body holding member and the cam member.

10. The gate valve as set forth in claim 9, wherein the compression coil spring is attached in an offset state from a non-load state and acts so that a reactive force by the offset recovers the valve body in the direction of an initial position via a relative movement of the rolling body holding member and the cam member.

11. The gate valve as set forth in claim 9, wherein the compression coil spring is provided so as to surround the rolling body holding member and the cam member.

12. The gate valve as set forth in claim 9, wherein the rolling body comprises a roller having a rolling plane for contacting the cam plane, and a roller shaft for supporting the roller so that it can freely rotate and being held by the rolling body holding member so that it can freely rotate.

13. The gate valve as set forth in claim 9, further comprising a sealing means for sealing between the valve rod and the sealed chamber so that the valve rod can move.

* * * * *